US007185611B2

(12) United States Patent
Schrader

(10) Patent No.: US 7,185,611 B2
(45) Date of Patent: *Mar. 6, 2007

(54) ANIMAL WASTE CONTAINMENT SYSTEMS

(76) Inventor: Rhonda Schrader, 947, Franklin Ave., Winthrop Harbor, IL (US) 60096

( * ) Notice: Subject to any disclaimer, the term of this patent is extended or adjusted under 35 U.S.C. 154(b) by 164 days.

This patent is subject to a terminal disclaimer.

(21) Appl. No.: 11/044,699

(22) Filed: Jan. 27, 2005

(65) Prior Publication Data

US 2005/0126507 A1 Jun. 16, 2005

Related U.S. Application Data

(63) Continuation-in-part of application No. 10/703,314, filed on Nov. 7, 2003, now Pat. No. 6,895,899, which is a continuation-in-part of application No. 10/634,688, filed on Aug. 4, 2003, now abandoned, which is a continuation of application No. 10/121,100, filed on Apr. 11, 2002, now Pat. No. 6,626,129.

(60) Provisional application No. 60/286,106, filed on Apr. 24, 2001.

(51) Int. Cl.
*A01K 1/00* (2006.01)
(52) U.S. Cl. ..................................... 119/479
(58) Field of Classification Search ............... 119/479, 119/462, 469, 467, 463, 421, 450, 163, 458
See application file for complete search history.

(56) References Cited

U.S. PATENT DOCUMENTS

| 3,429,297 | A | | 2/1969 | Schroer |
| 3,896,768 | A | | 7/1975 | Galloway |
| 4,009,685 | A | | 3/1977 | Sojka |
| 4,181,612 | A | | 1/1980 | Trail |
| 4,572,107 | A | | 2/1986 | Clarizo |
| 4,838,204 | A | | 6/1989 | Young |
| 4,913,095 | A | | 4/1990 | Morrow et al. |
| 5,148,771 | A | | 9/1992 | Schuett et al. |
| 5,156,640 | A | | 10/1992 | Del Rosario |
| 5,765,505 | A | | 6/1998 | Yun |
| 5,771,841 | A | | 6/1998 | Boor |
| 6,532,900 | B1 | * | 3/2003 | Wang .......................... 119/479 |

FOREIGN PATENT DOCUMENTS

WO    WO 98/04122    2/1998

* cited by examiner

*Primary Examiner*—Thomas Price
(74) *Attorney, Agent, or Firm*—Barnes & Thornburg LLP

(57) ABSTRACT

Waste containment systems for animal enclosures or animal support means, such as perches, are disclosed. A moving body of liquid in a tray traps waste and airborne contaminants and a filtration unit filters the waste. The filtered liquid is circulated with a pump. Methods for filtering waste from animal enclosures or animal support means are disclosed.

17 Claims, 2 Drawing Sheets

ANIMAL WASTE CONTAINMENT SYSTEMS

CROSS-REFERENCE TO RELATED APPLICATIONS

This application is a continuation-in-part of U.S. Ser. No. 10/703,314, filed Nov. 7, 2003 now U.S. Pat. No. 6,895,899, which is a continuation-in-part of U.S. Ser. No. 10/634,688 filed Aug. 4, 2003 now abandoned, which is a continuation of U.S. Ser. No. 10/121,100 filed Apr. 24, 2002, now U.S. Pat. No. 6,626,129 issued Sep. 30, 2003, which claims priority to provisional application No. 60/286,106, filed Apr. 24, 2001.

BACKGROUND

Maintaining birds or other pets or animals either in a residential or a commercial setting requires appropriate restraining and waste removal systems. Enclosures to restrain animals are typically made of wired or barred cages with floor bottoms. Some of these cages have grid floors to let the debris such as fecal matter, feathers, hair, bodily secretions, and left over food particles or other airborne particulates to pass through, while restraining one or more animals within the enclosures. Birds or other pets or animals can also be maintained on stands, perches or other support means that may or may not be surrounded by cages. To clean debris, newspaper liners, metallic pull-out trays, and other cleaning systems have been used.

SUMMARY

The present disclosure relates to a filtration system to trap and filter waste from an animal. The filtration system may be used, for example, with an animal enclosure or an animal support means such as, stands, perches, ladders or any other suitable supports.

BRIEF DESCRIPTION OF THE DRAWINGS

The drawings are provided to illustrate some of the embodiments of the disclosure. It is envisioned that alternate configurations of the embodiments of the present disclosure maybe adopted without deviating from the disclosure as illustrated in these drawings.

DETAILED DESCRIPTION

Figure 1:
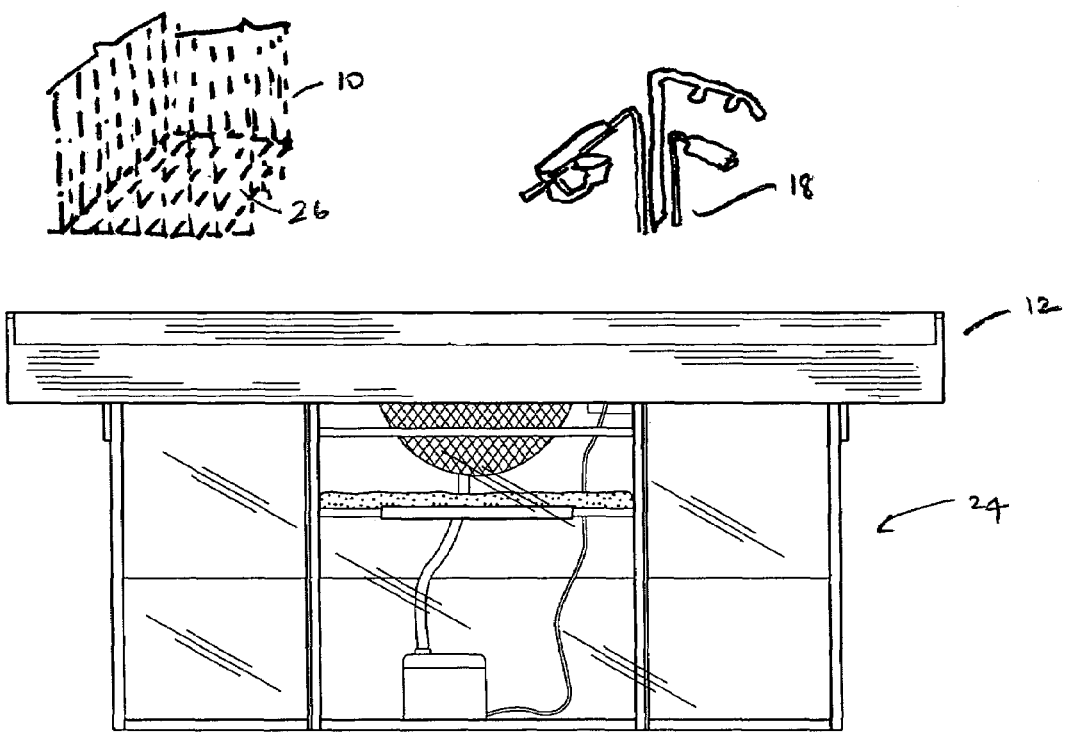
FIG. 1 is a front elevational view of a waste containment system in accordance with an illustrated embodiment of the present disclosure, with an animal enclosure and an animal support means schematically illustrated in partial view.

While the concepts of the present disclosure are illustrated and described in detail in the drawings and the description below, such an illustration and description is to be considered as exemplary and not restrictive in character, it being understood that only the illustrative embodiment is shown and described and that all changes and modifications that come within the spirit of the disclosure are desired to be protected.

Figure 3:
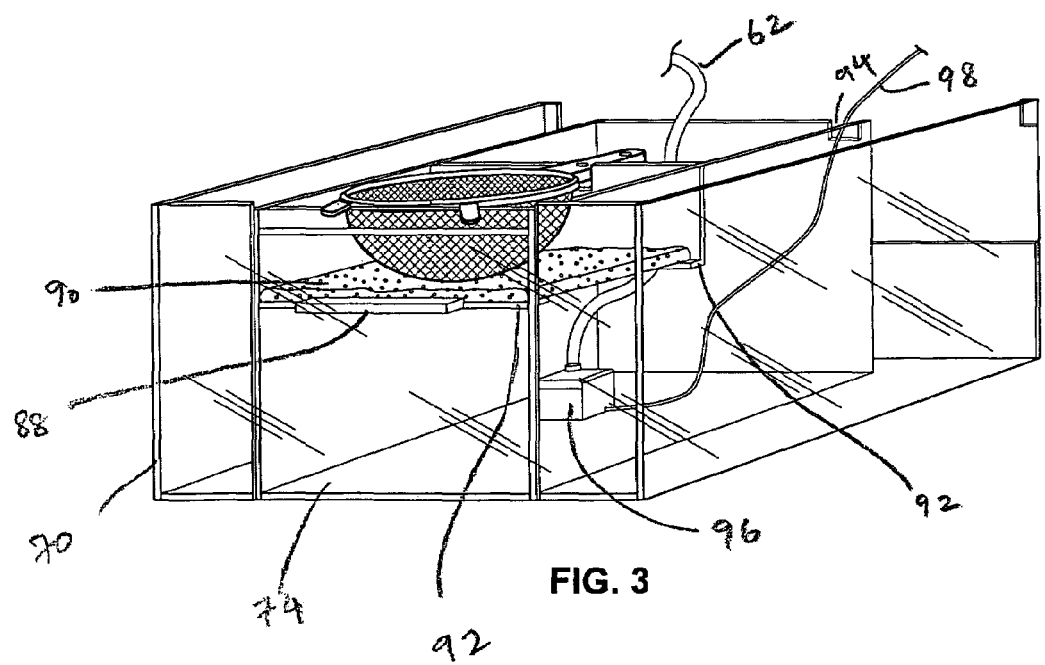
FIG. 3 is a partial perspective view of the waste containment system of FIG. 1 with various components removed to illustrate other components of the system.
Figure 2:
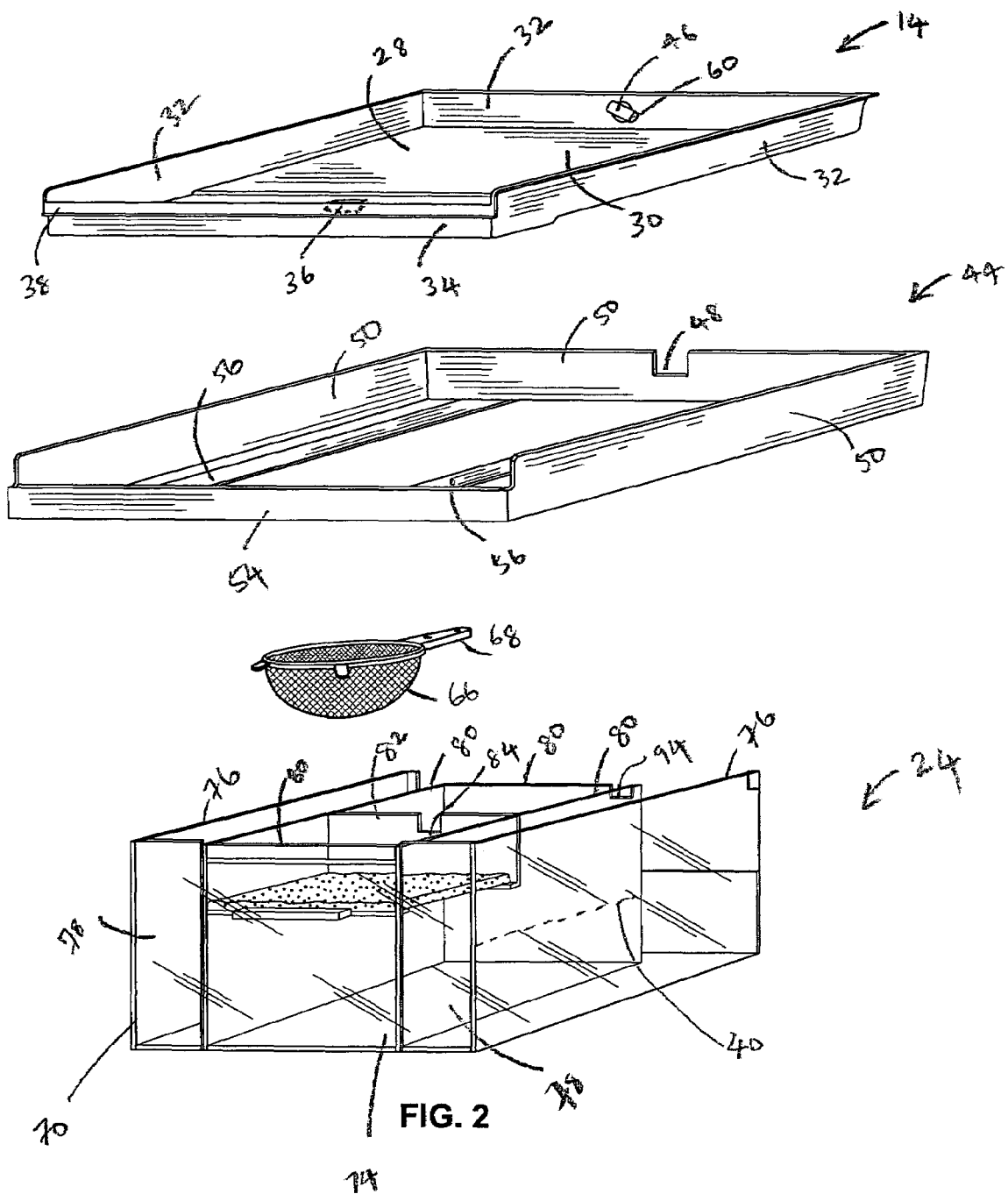
FIG. 2 is a partial exploded and partial perspective view of the waste containment system of FIG. 1, illustrating a tray, a tray support, and a filtration unit.

FIGS. 1–3 illustrate an embodiment of a waste containment system of the present disclosure comprising an animal enclosure 10 and/or an animal support means 18 and a filtration system 12 associated with the animal enclosure 10 or the animal support means 18. The filtration system 12 comprises a tray 14, a tray support 16, and a filtration unit 24, each of which may have any suitable configuration and construction.

In the illustrated embodiment, the animal enclosure 10 has a grid floor 26 to allow waste materials to pass through. The animal enclosure 10 may have any suitable configuration, construction, dimension, and may retain any suitable animal. The animal enclosure 10 may be removably or fixedly secured above the filtration system 12 or removably or fixedly suspended above the filtration system 12. The animal enclosure 10 may be, for example, a bird cage to retain birds. Other suitable animals that can be retained in the animal enclosure 10 include for example, rodents, mice, reptiles, lizards, turtles, rabbits, and snakes.

In the illustrated embodiment, the animal support means 18 is a perch to allow birds or other animals or pets to rest, play or feed. The animal support means 18 may have any suitable configuration, construction, dimension, and may support any suitable animal. The animal support means 18 such as, bird stands, perches, ladders, swings, suspended food cups, toys, or any suitable support may also be associated with the animal enclosure 10. The animal support means 18 may be removably or fixedly secured in any suitable way above the filtration system 12 or removably or fixedly suspended in any suitable way above the filtration system 12. The animal support means 18 may be, for example, a perch to support birds. Other suitable animals that can be supported by or otherwise engaged with in the animal support means 18 include for example, rodents, mice, reptiles, lizards, turtles, rabbits, and snakes.

The filtration system 12 may filter waste materials such as, for example, fecal material, feathers, hair, dander, skin tissue, bodily secretions, and food material.

In the illustrated embodiment, the tray 14 has a floor 30, three raised sides 32 and a fourth raised side 34 with an opening 36. The tray 14 defines a cavity 28 for receiving a liquid 40. The tray 14 is positioned below the animal enclosure 10 or the animal support means 18. The tray 14 or any suitable receptacle is configured to permit passage of a liquid 40 and waste that falls from the animal enclosure 10 or the animal support means 18. The liquid 40, with such waste materials, drains from the tray 14 through the opening 36 positioned towards the fourth raised side 34. The tray 14 slopes towards the edge 34 that is near the opening 36 to enable the liquid 40 to drain through the opening 36.

The tray 14 is positioned above a tray support structure 44. The fourth raised side 34 has a protrusion or a lip 38 to engage the tray 14 with the tray support structure 44. The tray support 44 has three raised sides 50 and a partially raised fourth side 54. A recess 48 on one of the raised sides 50 is configured to permit a tube 46 to rest and pass through the tray support 44. The tray support 44 has two railings 56 to enable the tray support 44 to be positioned over the filtration unit 24. The tray 14 and the cavity 28 may have any other suitable configuration in accordance with other embodiments of this disclosure. The slope of the tray 14 can be adjusted in any suitable manner, such as, for example, by having a slope capable of draining the liquid 40 towards the opening 36. The animal enclosure 10, animal support means 18, the tray 14, and the tray support 44 can be made of any suitable material, such as, for example, metal or plastic.

In the illustrated embodiment, a tube 46 is positioned on the side 32 of the tray 14 that is opposite to the opening 36. The tube 42 may have any suitable configuration and construction and can be positioned in any suitable manner, such as, for example, removably secured to the tray 14 using an adhesive such as, for example, rubber cement. The tube 42 can also be positioned on other sides of the tray 14 such that the liquid 40 drains towards the opening 36. The tube 46 may also have any number and form of opening 60 that permits passage of the liquid 40 to the tray 14. The tube 42, and the tubing 62 are made of flexible plastic, but they can also be made of any suitable material such as, for example, metals, or any other suitable material that is compatible with the liquid 40 containing animal waste.

In the illustrated embodiment in FIGS. 2 and 3, the filtration system 12 comprises a filtration unit 24, a mesh basket 66, a filter pad 90, and a circulating pump 96, each of which may have any suitable configuration and construction. The filtration unit 24 comprises an outer chamber 70 and an inner chamber 74. The inner chamber 74 is positioned within the outer chamber 70. The outer chamber 70 has raised sides 76 and 78. The two raised sides 78 of the outer chamber 70 are positioned adjacent to the inner chamber 74 such that the inner chamber 74 can slide in or out within the outer chamber 70. The inner chamber 74 has four raised sides 80 and a partition 82, which has a recess 84. The inner chamber 74 has a grip or a handle 88 to enable sliding the inner chamber 74. The inner chamber 74 functions as a liquid reservoir.

The inner chamber 74 houses the mesh basket 66 that has a handle 68. The mesh basket 66 is a screen made of any suitable material such as, for example, nylon, metal, or plastic. The mesh basket 66 may have any suitable configuration and construction and can be positioned in any suitable manner. The mesh basket 66 is removably positioned above the filter pad 90. The handle 68 of the mesh basket 66 is held through the recess 84 in the partition 82. The filter pad 90 is positioned removably over supports 92 within the inner chamber 74. The filter pad 90 is made of fiber material and also has a layer of charcoal inside the fiber material. A suitable filter pad such as, for example, Penguin170™, can be obtained from Marineland (Moorpark, Calif.). In the illustrated embodiment, the outer chamber 70 and the inner chamber 74 are made of acrylic. The outer chamber 70 and the inner chamber 74 can also be made of any suitable material such as, for example, plastic, metallic, composite resins, fiber glass and the like.

As illustrated in an embodiment shown in FIG. 3, the filtration unit 24 includes a circulating pump 96. In the illustrated embodiment, the tubing 62 connects the pump 96 to the tube 46 in the tray 14. A power chord 98 connects the pump 96 to a power source. The pump 96 permits circulation of the liquid 40 from the filtration unit 24 to the tray 14. The pump 96 may have any suitable configuration and construction, and may be positioned in any suitable manner within the inner chamber 74.

Optionally, an additional sterilizer unit (e.g., ultraviolet sterilizer unit) and an activated carbon filter can be used if necessary. Other modes of sterilization such as, for example, irradiation, chlorination, bromination, or application of antimicrobial agents can also be implemented to extend the life of the filter pad 90.

The tray 14 is positioned over the tray support 44. The three raised sides 32 of the tray 14 rest over the three raised sides 50 of the tray support 44. The fourth raised side 34 of the tray 14, through the lip 38, rests over the partially raised side 54 of the tray support 44. The tray 14 and the tray support 44 are positioned over the filtration unit 24. The railings 56 of the tray support 44 rest over the two raised sides 76 of the outer chamber 70. The tray 14 and the tray support 44 can be positioned in any suitable way over the filtration unit 24. In an embodiment, the tray 14 itself can be suitably positioned over the filtration unit 24 without the need for a tray support 44.

The filtration system 12 is configured to continuously filter animal waste by continuous circulation of the liquid 40. The tray 14 defines a cavity 28 configured to permit passage therethrough of the liquid 40 and the waste, to continuously receive the liquid 40 into the cavity 28, to continuously maintain in the cavity 28 a constant volume of the liquid 40 during the circulation, and to receive into the cavity 28 the waste, the tray also defining an opening contiguous with the cavity 28 for continuously discharging the liquid 40 and the waste from the cavity 28. The filtration unit 24 is associated with the tray 14 for receiving the liquid 40 and the waste discharged through the opening 36 and for filtering the waste from the liquid 40.

The constant volume of the liquid 40 may vary to some extent depending upon the fluctuations in the pump output or performance, amount of waste in the liquid 40; changes in liquid volume due to evaporation, any block in the tubing 62 or tube 46, or due to any other operating conditions.

The filtration system 12 may be configured to provide an auto-shut off float-switch that controls the pump 96 when the liquid level falls below a certain level in the inner chamber 74. The liquid 40 refers to any substance capable of flowing freely, such as, for example water.

The filtration system 12 may have other suitable configurations such as, for example, a configuration that fits a large floor-model animal support means 18 that rests within a tray 14 on stainless steel supports. The tray 14 may have any suitable configuration, such as, for example, same size and shape as the area covered by animal support means 18 or of smaller or a larger size than animal support means 18.

The mesh basket 66 may have any suitable configuration such as, for example, a flat, lift-out screen. The shape of the mesh basket 66 may have any suitable configuration such as, for example, rectangular, or conical. The mesh basket 66 can be placed directly on top of the filter pad 90 without any support. The mesh basket 66 may also be substituted by a flat permeable screen that traps large particulate matter such as seeds, hulls, and feathers. This screen may rest on top of the filter pad 90 or can rest within the tray 14 and may have any suitable configuration and construction such as, for example, rectangular, circular, or cubical, cylindrical or spherical in shape. The screen may be made of any suitable material such as, for example, plastic, metallic or any other suitable liquid-compatible material.

The pump 96 may have any suitable configuration. Operating requirements of the pump 96 depends on the amount of liquid 40 to be circulated, the speed with which the liquid 40 needs to be circulated, the noise level of the pump 96, and also on the power consumed. The specifications of a suitable pump 96 can be determined by one of ordinary skill in the art and can be obtained from a standard pump manufacturer.

The filtration system 12 can also be configured to have a commercial filtration unit. The commercial filtration units can be adapted to filter the liquid 40 with waste described herein. Such commercial filtration units may use a filtering mechanism that may be different from the one disclosed in the illustrated embodiment without deviating from the scope disclosed herein.

The filtration system 12 can also be configured to provide an optimal flow-speed for the liquid 40 in the tray 14, such that sufficient time lapses for an animal handler to visually observe the condition of the excreta. Visual monitoring of the animal excreta such as bird droppings may be helpful in diagnosing illness. An optimal flow-speed for the liquid 40 can be set using a standard valve at the tubing 46 to regulate the flow of liquid 40, by controlling output of the pump 96, or by adjusting the slope of the tray 14 that contains the liquid 40. The level of the liquid 40 flowing in the tray 14 can be suitably adjusted by modulating the flow-speed of the pump 96, by adjusting the slope of the tray 14, or by adjusting the opening 36 of the tray 14. The level and the speed of flow of liquid 40 may depend upon the amount of waste generated, the filtering capacity of the filtration unit 24, and the pumping capacity of the pump 96.

The filtration system 12 can also be configured to provide a soothing sound of flowing liquid 40 to the animals in the animal enclosure 10 or in the support means 18 as well as to the animal handlers and pet owners. This may be achieved by adjusting the speed of the flow of the liquid 40 to create a comfortable and a soothing sound. In addition, the flow of the liquid 40 in the tray 14 can be modified, such as, for example, through a bed of pebbles or rocks to create natural sounds.

The filtration system 12 can also be configured to have the animal enclosure 10, the animal support means 18, the tray 14, and the tray support 44 made of durable stainless steel to minimize wear and tear and also to reduce microbial contamination by having a non-porous surface. The stainless steel components may have round edges to reduce injury to animals and animal handlers. The components of the filtration system 12 the animal enclosure 10, and the animal support means 18 can also be made of other suitable materials such as, for example, plastic, metallic alloys, aluminum, composite fibers, or any other suitable material that is compatible with liquid 40 containing waste.

The filtration system 12 can also be configured to provide humidity to animals in the animal support means 18. This may be achieved by the continuous movement of the liquid 40 such as, for example, water. Increase in humidity may be beneficial to certain caged animals, for example, birds in the animal enclosure 10 or in the animal support means 18.

The filtration system 12 can also be configured to provide fragrance to the circulating liquid 40 for an aromatherapy. This may be achieved by adding chemicals or extracts or any other formulations to the liquid 40, which release desired fragrance to the environment. These chemicals or extracts or any other formulations can also be used to mask any odor arising from the waste containment system and can be supplemented as necessary.

One way of operating the filtration system 12 is to position the animal enclosure 10 or the animal support means 18 for waste removal, above a tray 14. A filtration unit 24 is filled with the liquid 40. In the illustrated embodiment, the liquid 40 is water. A tubing 52 connects the pump 96 to the tray 14 through the tube 46. When the pump 96, positioned within the inner chamber 74, is turned on, the liquid 40 is delivered through the opening 60 in the tube 46, to form a body of liquid 40 that flows continuously across the tray 14. This continuously flowing liquid 40 traps and gradually removes waste and other airborne particulate that descend from the animal enclosure 10 or the animal support means 18. The waste-filled liquid 40 drains through the opening 36 of the tray 14 into the mesh basket 66. For large particulate waste such as, for example, large food particles or other large waste particles, a brush or a squeegee any other similar device may be used to move the waste towards the opening 60, if necessary. The opening 60 channels the liquid 40 into the mesh basket 66. The mesh basket 66 rests on top of the filter pad 90. The mesh basket 66 can be removed and cleaned daily to dispose debris such as seeds, feathers, and hulls. The liquid 40 with any finer particulate continues to flow through the filter pad 90.

The filter pad 90 is useful to trap and hold the finer particulate such as dander and granular waste. The carbon layer within the filter pad 90 removes odors and purifies the water collected in the inner chamber 74. The pump 70 is connected to the tube 46 by the tubing 62. Filtered liquid 40 is circulated to the tray 14 to continue the filtering process described above. The liquid 40 is recycled as a filtering medium by the filtration unit 24.

In the illustrated embodiment, the following steps may be practiced for periodic maintenance of the filtration system on a daily basis or as necessary:

(a) Move any large particulate waste on the tray 14 towards the opening 36 with a brush or any other similar device.
(b) The pump 96 is turned off.
(c) The inner chamber 74 is pulled out with the handle 88.
(d) The mesh basket 66 is removed and the accumulated waste is disposed.
(e) The mesh basket 66 is replaced.
(f) Water level in the inner chamber 74 is checked and the required amount of liquid 40 is replenished if necessary.
(g) The inner chamber 74 is pushed inside the outer chamber 70 with the handle 88.
(h) The pump 96 is turned on.

The following steps may be performed on a weekly basis or as needed:

(a) The pump 96 is turned off.
(b) The filter pad 90 is removed, rinsed and replaced.
(c) The pump 96 is turned on.

Additionally, if needed, the inner chamber 74 can be drained and replenished with fresh liquid 40, whenever necessary.

By providing a moving body of liquid the filtration system 12 of the present disclosure removes the waste materials before they become dry or affixed in the tray 14. The waste materials that fall on the liquid 40 in the tray 14 are washed away by the moving body of the liquid 40.

There is a plurality of advantages that may be inferred from the present disclosure arising from the various features of the apparatus, systems, and methods described herein. It will be noted that other embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the disclosure.

I claim:

1. A filtration system configured to continuously filter animal waste by a continuous circulation of a liquid, the system comprising:

a tray defining a cavity configured to permit passage therethrough of the liquid and the waste, the tray configured to continuously receive the liquid into the cavity, to continuously maintain in the cavity a constant volume of the liquid during the circulation, and to receive into the cavity the waste, the tray also defining an opening contiguous with the cavity for continuously discharging the liquid and the waste from the cavity;

a filtration unit associated with the tray for receiving the liquid and the waste discharged through the opening and for filtering the waste from the liquid; and a pump for delivering the liquid from the filtration unit into the cavity of the tray.

2. The filtration system of claim 1, wherein the tray comprises four raised sides.

3. The filtration system of claim 1, wherein the tray is configured to slope towards the opening.

4. The filtration system of claim 1, wherein constant volume of the liquid flows continuously through the cavity.

5. The filtration system of claim 1, wherein the liquid is water.

6. The filtration system of claim 1, associated with an animal support means selected from the group consisting of bird stand, food cup, perch, ladder, swing, toy, and support.

7. The filtration system of claim 1, associated with an animal enclosure.

8. The filtration system of claim 7, wherein the animal enclosure is a bird cage.

9. The filtration system of claim 1, wherein the filtration unit comprises:
   a permeable screen; and
   a filter pad.

10. A table top waste containment system comprising:
    at least one of an animal enclosure or an animal support means;
    a tray associated with the at least one animal enclosure of the animal support means, the tray defining a cavity configured to permit passage therethrough of the liquid and the waste, the tray configured to continuously receive the liquid into the cavity, to continuously maintain in the cavity a constant volume of the liquid during the circulation, and to receive into the cavity the waste, the tray also defining an opening contiguous with the cavity for continuously discharging the liquid and the waste from the cavity;
    a filtration unit associated with the tray for receiving the liquid and the waste discharged through the opening and for filtering the waste from the liquid; and
    a pump for delivering the liquid from the filtration unit into the cavity of the tray.

11. The waste containment system of claim 10, wherein the liquid is water.

12. The waste containment system of claim 10, wherein the animal support means is selected from the group consisting of bird stands, food cups, perches, ladders, swings, toys, and supports.

13. The waste containment system of claim 10, wherein the animal enclosure is a bird cage.

14. A method of filtering waste from an animal, the method comprising the steps:
    (a) providing a continuously moving body of liquid that flows through a cavity and through an opening defined by a tray associated with at least one of an animal enclosure or an animal support means for collecting the waste;
    (b) filtering the waste from the liquid by a filtration unit; and
    (c) circulating the liquid from the filtration unit to the tray with a pump.

15. The method of claim 14, wherein the animal support means is selected from the group consisting of bird stand, food cup, perch, ladder, swing, toy, and support.

16. The method of claim 14, wherein the animal enclosure is a bird cage.

17. The method of claim 14, wherein the liquid is water.

* * * * *